(12) United States Patent
Jones et al.

(10) Patent No.: US 7,477,769 B2
(45) Date of Patent: Jan. 13, 2009

(54) DATA PROCESSING METHOD USABLE FOR ESTIMATION OF TRANSFORMED SIGNALS

(75) Inventors: Graham R. Jones, Faringdon (GB); Miles Hansard, London (GB)

(73) Assignee: Sharp Kabushiki Kaisha, Osaka (JP)

( * ) Notice: Subject to any disclaimer, the term of this patent is extended or adjusted under 35 U.S.C. 154(b) by 687 days.

(21) Appl. No.: 11/209,466

(22) Filed: Aug. 23, 2005

(65) Prior Publication Data
US 2006/0045380 A1    Mar. 2, 2006

(30) Foreign Application Priority Data
Aug. 26, 2004    (GB) .................................. 0418968.4

(51) Int. Cl.
*G06K 9/00* (2006.01)
*G06K 9/36* (2006.01)
(52) U.S. Cl. ........................ 382/130; 382/276
(58) Field of Classification Search ................ 382/130, 382/276
See application file for complete search history.

(56) References Cited
U.S. PATENT DOCUMENTS
7,126,616 B2 *  10/2006  Jasa et al. .................. 345/645

\* cited by examiner

*Primary Examiner*—David V Bruce
(74) *Attorney, Agent, or Firm*—Renner, Otto, Boisselle & Sklar, LLP

(57) ABSTRACT

A method of processing data is privided. The method comprises the steps of: comparing first and second samples of a space, the first and second samples being related by a set of transformations, to provide a set of pairs of signals, each of said pairs of signals corresponding to substantially the same feature in the space in the first and second samples; for each of the pairs of signals, evaluating residuals corresponding to the differences between the values of the space in each sample; evaluating a first estimate of the set of transformations from the residuals; estimating a tensor field representing orientation of flow in the space, the tensor field covering at least one point in the space; and recalculating, from the first estimate and the tensor field, the residuals for each of the pairs of signals to improve the estimate of the set of transformations.

28 Claims, 4 Drawing Sheets

FIG 3a
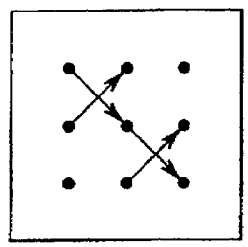
FIG 3b
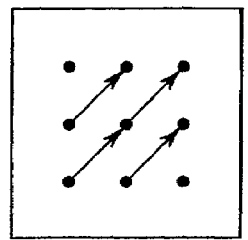
FIG 3c
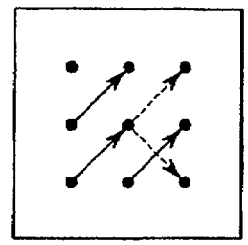
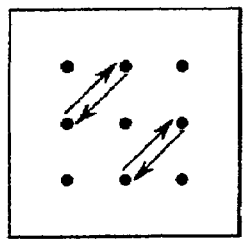
FIG 4a
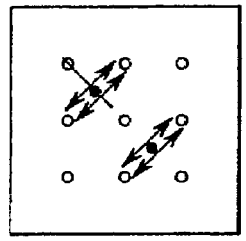
FIG 4b
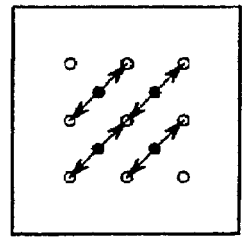
FIG 4c
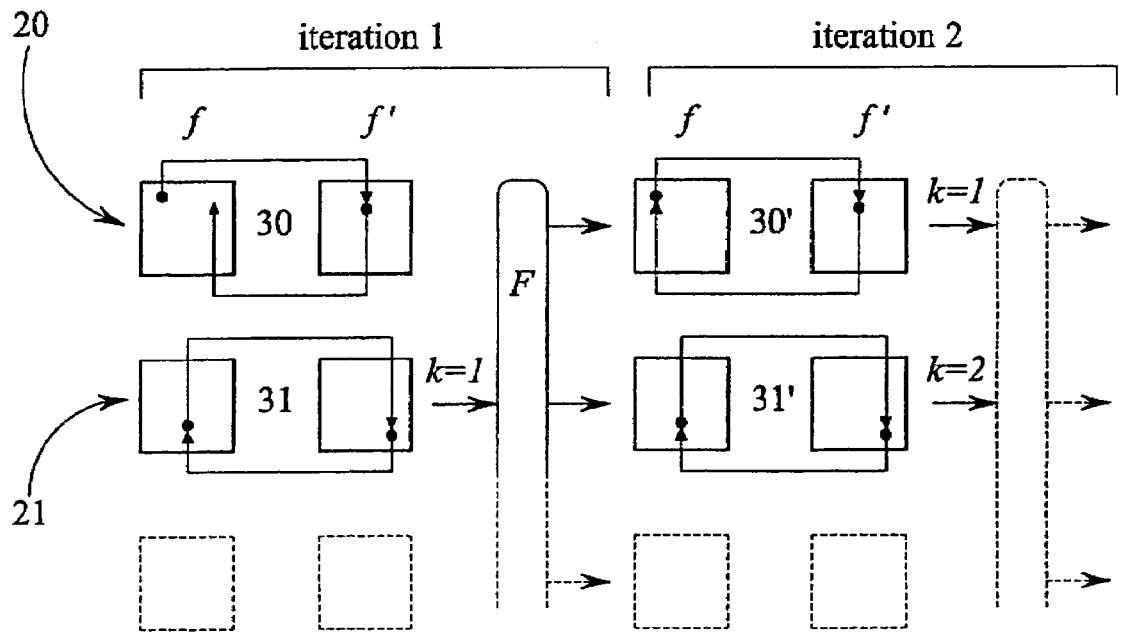
FIG 5

DATA PROCESSING METHOD USABLE FOR ESTIMATION OF TRANSFORMED SIGNALS

TECHNICAL FIELD

The present invention relates to processing data to improve the estimate of a transformation between two signals. It is assumed that each signal is sampled, and that each sample comprises two or more measured variables. For example, each pixel in a typical colour image consists of red, green and blue values.

BACKGROUND

The transformation between two signals can be estimated by matching samples from one input to corresponding samples in the other. For example, the motion of an object can be estimated by tracking image-features between successive video frames, as described by Horn and Schunck, Determining Optic Flow, Artificial Intelligence, 17, 185-204, 1981. Under the assumption that the corresponding points within the image have the same brightness or colour in adjacent frames, the motion field can be estimated by matching corresponding points from one image to another. The accuracy of such estimates is limited by the content of the images. For example, regions of the image having a uniform brightness or colour will not yield accurate information as to potential motion, because for each point in such a region, there will be many possible matches in the adjacent video frames.

It is shown, however, in Horn and Schunck, that the motion field can be estimated in featureless regions. If the scene consists of locally smooth surfaces, then the resulting motion field will also be locally smooth. Adopting this smoothness as a constraint ensures that the motion estimates in featureless regions are consistent with the estimates obtained in nearby, but more feature-rich regions of the images. The effect of the smoothness constraint is to impose a condition that the directions of neighbouring motion estimates are approximately parallel to one another. In essence, this method imposes a smoothness constraint onto a geometric mapping between matching features.

In Jähne et al, Study of Dynamical Processes with Tensor-Based Spatial Temporal Image Processing Techniques, Proceedings of European Conference on Computer Vision, pp 323-336, 1998, an alternative approach to optical flow estimation is given. In order to detect motion between adjacent frames of video data, the video sequence is represented as a volume in (x, y, t), where x and y are the two spatial dimensions of the video data and t represents time. Adopting this approach, any moving feature will appear as an oriented structure in the volume. For example, a moving point would trace out a line in the three-dimensional space whereas a moving edge would sweep out an oriented plane. Such lines and planes can be detected by evaluation of the structure tensor at each point in the space. The structure tensor is defined in Knutsson, Representing Local Structure using Tensors, Proceedings of the Sixth Scandinavian Conference of Image Analysis, pp 244-251, 1989, in which the structure tensor is represented by a matrix, the eigenvalues of which are functions of the local dimensionality of the signal.

A method of recovering the internal structure of a high-dimensional data-set is given in Roweis and Saul, Nonlinear Dimensionality Reduction by Locally Linear Embedding, Science 290, pp 2323-2326, 2000. The method is based on the concept that a given data point may be represented as a linear combination of its nearest neighbours in the high-dimensional space. For data which lies on a lower-dimensional surface, the neighbouring points can be used to construct a local coordinate system that dispenses with at least some of the original axes. The result of this process is a "local linear embedding", which facilitates interpretation of the original data.

Miller and Tieu, Colour Eigenflows: Statistical Modelling of Joint Colour Changes, Proceedings of the International Conference on Computer Vision, pp 607-614, 2001 disclose image analysis which considers the changes in ambient lighting. A statistical model of how a given colour in a particular image changes with respect to the illuminant is constructed. This enables prediction, given an input image, of the appearance of the scene under different illumination. Changes in the appearance of the image, for example the parallax introduced by moving the view point, are not considered. This statistical model is akin to imposing the smoothness constraint onto a photometric mapping.

SUMMARY

According to a first aspect of the invention, there is provided a method of processing data comprising: (a) comparing first and second samples of a space, the first and second samples being related by a set of transformations, to provide a set of pairs of signals, each of the pairs of signals corresponding to substantially the same features in the space in the first and second samples; (b) for each of the pairs of signals, evaluating residuals corresponding to the differences between the values of the space at the location of the feature in each sample; (c) evaluating a first estimate of the set of transformations from the residuals; (d) estimating a tensor field representing orientation of flow in the space, the tensor field covering at least one point in the space; and (e) recalculating, from the first estimate and the tensor field, the residuals for each of the pairs of signals to improve the estimate of the set of transformations.

Steps (d) and (e) may be repeated at least once.

The step (a) may be effected using a signal-matching algorithm.

The residuals may be equal to $d_k = f'(p_k) - f''(p_k + t_k)$, where $f'(p_k)$ and $f''(p_k + t_k)$ are a pair of signals corresponding to substantially the same feature in the space, measured at points $p_k$ and $p_k + t_k$, respectively, $t_k$ represents the set of transformations and k is the index of each pair of signals. Step (c) may comprise defining a symmetric and positive-definite matrix M, such that $|d_k|_M = (d_k^T M d_k)^{1/2}$, and minimising $|d_k|$ with respect to $t_k$.

The step of estimating a tensor field may be carried out for every point in the space and may comprise determining tensors for regions in which no tensor has yet been determined by interpolating between existing tensors obtained from prior estimates of the set of transformations. The interpolation may be based upon a neighbourhood weighting function whose value decreases monotonically away from the location of the pair of signals. The neighbourhood weighting function may be a Gaussian function. The tensor field may be used to calculate a matrix $M_f$ representing the set of transformations at each point in the space. The eigenvalues of the matrix $M_f$ may be chosen to fit the dimensionality of the set of transformations.

The method may be iterated until a convergence condition is met. The dimensionality of the estimate of the set of transformations may be subject to at least one constraint. This constraint may be a spatial smoothness or a diochromatic model constraint.

The method may be applied to data wherein the first and second samples of a space are first and second images, the space is a red-green-blue colour space, and the set of transformations represent a spatial disparity at each point in the images. The method may be applied to the image data to provide image recognition or image prediction. The estimated tensor field may be used to create a model of a transformation between first and second images.

According to a second aspect of the invention, there is provided a method of estimating disparity between first and second images, comprising: computing first and second disparity maps for matching features in the first and second images, corresponding to first image to second image disparity and second image to first image disparity, respectively; deleting inconsistent entries from the first and second disparity maps to obtain a cross-checked third disparity map; and improving the third disparity map in accordance with the first aspect of the invention, using the third disparity map as the first estimate of the set of transformations.

According to a third aspect of the invention, there is provided a method of estimating motion in a video stream, comprising applying the method of the first aspect of the invention to substantially adjacent pairs of images from the video stream, the pairs of images corresponding to the first and second samples in a red-green-blue colour space. In such a method, the step of estimating a tensor field covering each point in the space for a given substantially adjacent pair of images may comprise estimating a current tensor field using a prior tensor field evaluated when matching a prior pair of images from the video stream. The current tensor field may be recursively estimated from the prior tensor field.

The method may be applied to audio data as part of a speech recognition algorithm.

Further aspects of the present invention include a program for controlling a computer to perform the above-described methods, such a program when stored on a storage medium, transmission of such a program across a communications network, and a computer programmed to perform such a method.

In accordance with a further aspect of the present invention, there is provided an apparatus for matching signals, comprising: means for comparing first and second samples of a space, the first and second samples being related by a set of (unknown) transformations, to provide a set of pairs of signals, each of the pairs of signals corresponding to substantially the same feature in the space in the first and second samples; means for evaluating residuals for each of the pairs of signals, the residuals corresponding to the differences between the characteristics of the space at the location of the feature in each sample; means for evaluating a first estimate of the set of transformations from the residuals; and means for estimating a tensor field representing orientation of flow in the space, the tensor field covering each point in the space; and means for recalculating, from the first estimate and the tensor field, the residuals for each of the pairs of signals to improve the estimate of the set of transformations.

BRIEF DESCRIPTION OF DRAWINGS

FIG. 3a to 3c are a comparison between a one-dimensional and a two-dimensional flow field;

FIG. 4a to 4c illustrate vector and tensor representations of a one-dimensional flow;

FIG. 5 illustrates an image matching algorithm in accordance with an embodiment of the present invention;

DETAILED DESCRIPTION

Figure 1:
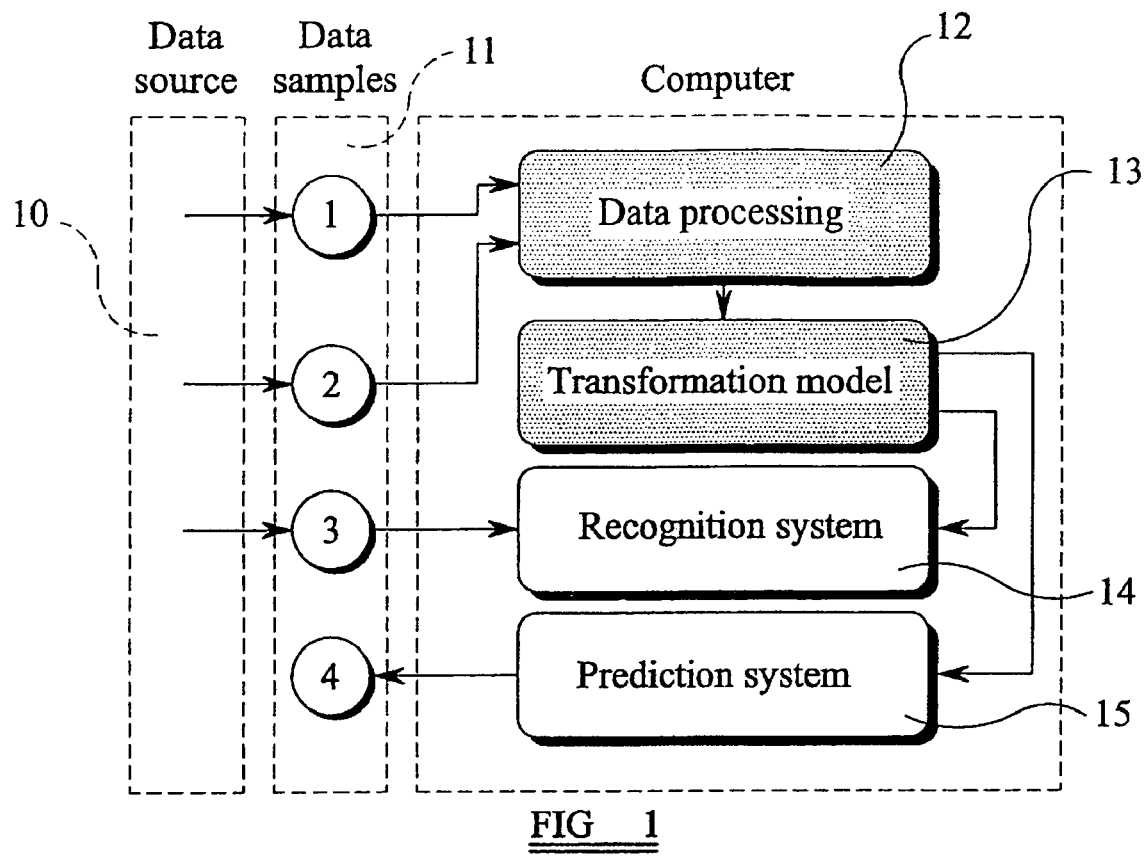
FIG. 1 is a flow diagram illustrating the implementation of the method of an embodiment of the present invention.

The method as described hereinbelow will be described primarily with reference to matching graphical images, although this is merely an example and the method may be used in other applications, such as speech recognition. The method is generally applicable to the matching of so-called vector-valued signals. Such signals can be thought of as inputs with a number of measurable variables at each point. For example, a typical colour image has three variables: red, green and blue, at each spatial position. The method of an embodiment of the present invention starts from two sets of samples of a space, for example two images taken of a scene, and provides an effective way of matching features which correspond in the two images. The appearance of a single feature may change between two different views due to a variety of reasons, including change in perspective from the viewpoint and differences in illumination. Matching the common features enables a transformation model of the scene to be established from which images can be created from a novel viewpoint, other images from the scene may be recognised, and motion estimation of common features may be estimated, in addition to other applications.

The transformation model is estimated by comparing the positions of corresponding features in the two views. In order to make this comparison, image points must be "matched" between the two views. The change in appearance of the common features is a multi-dimensional function, mapping each point to a new position and colour. Position is a two-dimensional parameter, whilst colour is a three-dimensional parameter (red, green, blue).

It is generally difficult to make accurate estimates of such mappings because the signals may be locally ambiguous. There may be no way to distinguish between many possible mappings, even if there is only one correct solution. To reduce the number of possible mappings it is necessary to constrain the choice of mappings in some way. The method provided by the embodiments of the present invention consists of a signal-matching procedure that imposes a novel form of constraint.

When imposing a dimensionality constraint, it is generally expected that the dimensionality of mapping between two signals is lower than that of the signals themselves. Consider the example of two colour images, related by a spatial mapping and a brightness offset. The brightness offset can be interpreted as a one-dimensional transformation of the three-dimensional colour space. A model of this transformation can be constructed, and used to help estimate the spatial mapping. Although the transformation between the colours (or other dependent variables) may be much more complex, a useful model can typically be constructed by the method described here.

The term "space", as used herein, refers to a set of points, each point being determined by a unique combination of values from each of a set of variables. For example, each point in a space of colours can be determined by its red, green and blue values.

It is useful to compare the methods of the embodiments of the present invention to the algorithm of Horn and Schunck.

Both methods apply constraints in order to improve the estimate of a signal transformation. The Horn and Schunck method constrains the transformation to be spatially smooth. This approach results in a biased solution, because the underlying transformation may not always be smooth; for example, the motion field produced by an object moving across a static backdrop is discontinuous at the boundary of the object. The methods of the embodiments of the present invention impose constraints on the dependent variables of the transformation. In particular, the dependent variables are required to change consistently with respect to the transformation.

For example, the dependent variables of a typical image are the red, green and blue values at each spatial position. Suppose that the two input signals are views of the same object, taken from slightly different positions. The apparent colour of a scene point can be modelled as a mixture of the 'surface' and 'illuminant' colours. Although a given scene-point may have a different colour in each view (e.g. due to lighting effects) both colours should be mixtures of the same surface and illuminant components. This constraint can be enforced by the present method. The advantage of this approach is that it applies to both the continuous and discontinuous parts of the signal transformation.

The block diagram of FIG. 1 illustrates the applications of the method described below. Data samples 1 and 2 are taken from a data source 10. The data source 10 may be, for example, a visible scene, in which case the samples 1 and 2 are images of that scene. The data sample domain 11 is a subset of the data source 10. The samples 1 and 2 are subject to data processing 12 which yields a transformation model 13. The transformation model 13 can be used to provide an image recognition system 14 for detecting previously unanalysed data sample 3. Alternatively the transformation model 13 may be used in a prediction system 15 to create a novel data sample corresponding to an artificially generated view of the data source 10.

Figure 2A:
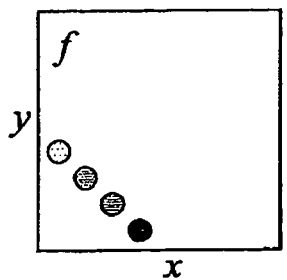
FIGS. 2a to 2f illustrate the steps of image matching.
Figure 2B:
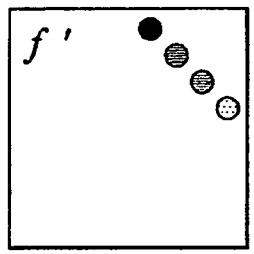
Figure 2C:
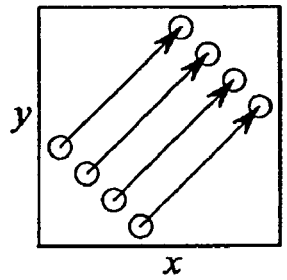
Figure 2D:
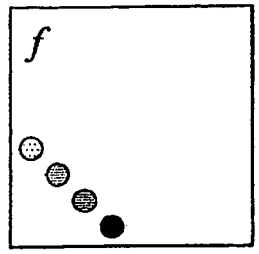
Figure 2E:
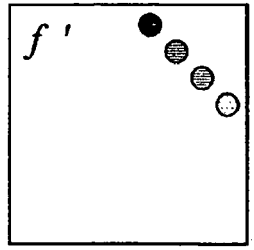
Figure 2F:
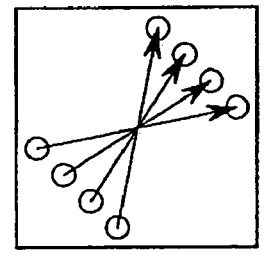

FIGS. 2a to 2f illustrate the general approach to image-matching. FIGS. 2a and 2b show images f' and f" representing different views of the same scene. The images are matched by identifying points with similar colours, and the resulting spatial flow is shown in FIG. 2c. Note that the flow is smooth. Two further views are shown in FIGS. 2d and 2e, which can be matched as before. However, in this example the resulting spatial flow is not smooth.

Although signal matching algorithms are known for matching common features between two images, the method described herein increases the accuracy and the completeness of the computed mappings. The accuracy can be improved because the dimensionality constraint described below can be used to make mapping consistent with a physical model of the transformation. The completeness can be improved because, for ambiguous regions, the dimensionality constraint eliminates a large number of spurious solutions.

The method can be combined with further constraints, for example the smoothness constraint described in Horn and Schunck. Further details of the latter are given below. Alternatively, the method may be applied in the absence of any further constraints. The main problem with smoothness constraints is that they must be used selectively. In particular, to avoid biasing the estimate, smoothing should not be applied across depth or motion boundaries. This greatly complicates the signal-matching problem, because the locations of the discontinuities must be estimated in conjunction with the point-matches. By contrast, the dimensionality constraint described here can be applied to both the continuous and discontinuous parts of the signal transformation.

The method may be easily combined with existing matching algorithms and can be turned on or off as required. The computational overhead introduced by the method is easily managed; for a given pair of samples, the new metric adds a constant amount to the cost of computing the original Euclidean distance. The representation constructed during the matching procedure may have additional uses. For example, when considering the matching of two images of a particular scene, the representation constitutes a photometric model of the scene which may be used in rendering any novel views, leading to a more accurate result.

A more detailed description of a particular embodiment of the present invention will now be described.

Two signals, taking values from a space $\mathcal{F}$, are defined as f' and f". These two signals are measured at points $p_k$, where k is a convenient index for the samples. The method of this embodiment may be considered as solving a matching problem of the form $$f'(p_k) \leftrightarrow f''(p_k + t_k), k = 1 \ldots K, \quad [1]$$

the vectors $t_k$ defining the underlying transformation. The symbol ↔ indicates that the two signals match at points $p_k$ and $p_k + t_k$, respectively.

The method described herein may be applied to match any pair of vector-valued signals and may be extended to any number of dimensions and any range of functions. However, this embodiment will be described in connection with colour images in which the domain of each signal consists of points p=(x, y) and the range of each signal is the RGB colour-space $\mathcal{F}$ such that f'=(r',g',b') and f"=(r",g",b"). For example, Equation 1 can be interpreted as a mapping between two views f' and f" at the scene, with $t_k$ being the parallax of each point $p_k$.

The object of the matching algorithm is to recover the underlying transformation vectors $t_k$. This is achieved by minimising the error d with respect to the possible values of $t_k$, where $$d_k = f'(p_k) - f''(p_k + t_k). \quad [2]$$

Equation 2 provides a definition of a "residual" vector $d_k$. The norm d is usually equal to the Euclidean distance, so that if d is a column vector and $d^T$ is its transpose, then $|d| = (d^T d)^{1/2}$. The method of the embodiment provides a generalisation of this definition, in particular by considering metrics of the type $$|d|_M = (d^T M d)^{1/2}, \quad [3]$$

where M is a symmetric and positive-definite matrix. In particular, if M is the identity matrix, then $|d|_M$ reduces to the Euclidean distance $|d|$. In general, however, the matrix M is allowed to vary over the space $\mathcal{F}$. This means that a given discrepancy d, as defined in Equation 2, may seem to be smaller or larger, depending on the individual locations of f' and f" in $\mathcal{F}$. The motivation for this is shown in FIGS. 3a-3c. FIG. 3a illustrates a two-dimensional flow $d_k$ in a two-dimensional space $\mathcal{F}$. The axes of the two dimensional space represent the dependent variables of the mapping. For example, the square could represent a slice through the cube containing the RGB colour space, $\mathcal{F}$, in which case the arrows would indicate matches between similar colours. The arrows indicate the direction of the flow of the four flow vectors illustrated. FIG. 3b illustrates a one-dimensional flow (all the vectors being aligned) in a two-dimensional space. The local dimensionality of the flow may vary within the space. Two possible matches are illustrated in FIG. 3c and indicated by the residual vectors shown as dashed arrows. The residual vectors are the same length and therefore the two matches are equally plausible according to the ordinary measure, |d|. However, only one of the two residuals is consistent with the existing one-dimensional local flow shown in FIG. 3b. It would be preferable for the metric of Equation 3 to yield a "shorter" length to this residual so that the consistent match is preferred.

Known matches f'($p_k$)↔f"($p_k$+$t_k$) from a previous iteration of the algorithm or, in the first instance, the first set of residuals $d_k$, are used to define M at each point in the space $\mathcal{F}$. The definition is based on the associated 'residual' vectors $d_k$, each of which connects two points $f_k'$ and $f_k''$ in $\mathcal{F}$. It is natural to attach each residual to the midpoint, which is defined as $$f_k = \frac{1}{2}(f_k' + f_k''),\qquad [4]$$

such that $$f_k' = f_k - \frac{1}{2}d_k \text{ and } f_k'' = f_k + \frac{1}{2}d_k.$$

Next, each known residual is represented as a symmetric matrix, formed by the normalized outer-product $$\Delta_k = \frac{d_k d_k^T}{|d_k|^2}.\qquad [5]$$

This structure tensor representation was proposed in a different context by Knutsson. In effect, $d_k$ represents a direction, whereas $\Delta_k$ represents an orientation.

FIGS. 4a to 4c illustrate the differences between local direction and local orientation as represented by $d_k$ and $\Delta_k$, respectively. FIG. 4a is a vector representation of a sampled one-dimensional flow, $d_k$. The average of the vectors is zero. FIG. 4b is a tensor representation $\Delta_k$ of the same sampled flow, the tensors being attached to the midpoint of the original vectors. The average of the tensors is representative of the flow.

The next step is to define M at each point in $\mathcal{F}$, based on the value of $\Delta$ at that point. This is not immediately possible because, in general, only a subset of points in $\mathcal{F}$ will have associated tensors. Nonetheless, it is straightforward to 'fill in' the missing tensors, using a scheme which is similar to that described by Miller and Tieu. A tensor at any point f can be obtained from the local average $$\Delta_f^* = \frac{\sum_{k=1}^{K} N_k(f, f_k) \Delta_k}{\sum_{k=1}^{K} N_k(f, f_k)},\qquad [6]$$

where $N_k(f, f_k)$ is a 'neighbourhood' function which takes a high value when $f_k$ is close to f and falls monotonically to zero as the points become distant. A Gaussian curve of a given variance is a natural choice. The averaged and interpolated tensor representation $\Delta_f^*$ is illustrated in FIG. 4c. There is now only the tensor at each point f, and some additional tensors have been interpolated. The result is a complete estimate of the flow that generated the vectors of FIG. 4a. It is also possible to incorporate geometric information into the neighbouring function. For example, suppose that $p_k$ is defined by analogy with $f_k$ in Equation 4. The weighting $N_k(.,.)$ can then be a function of the separation between p and $p_k$, as well as the corresponding values f and $f_k$. This modification makes the scheme more conservative, as flow-information is only integrated over points $p_k$ that are close to p. The precise definition of $N_k(.,.)$ will depend on the application.

The discrepancies d and −d are consistent with the same oriented flow-structure, although their directions are opposed. If the interpolation procedure in Equation 6 were applied directly to the residual vectors, they would cancel each other out. This is the reason for the tensor representation; according to Equation 5, d and −d map to the same tensor and so the opposite directions support the same flow estimate in Equation 6.

Using Equation 6, a matrix $M_f$ can be estimated at each point in $\mathcal{F}$, based on the corresponding matrix $\Delta_f^*$. The underlying idea is that if the local flow lies in a subspace of $\mathcal{F}$, then $M_f$ should 'underestimate' distances measured in this subspace. It follows that any matches in the flow subspace will tend to be favoured. This achieves the principle objective of the embodiment, which is to make use of inherent structure in the signal-to-signal mapping, as shown in FIGS. 3a-3c.

The matrix $M_f$ is set to have the same normalized eigenvectors as $\Delta_f^*$, because these are aligned with the local structure of the flow field. The dimensionality of the local flow is estimated from the eigenvalues of $\Delta_f^*$. If the local flow does not have the required dimensionality, then the eigenvalues of $M_f$ are set to unity, so that $|d|_M$ corresponds to the Euclidean distance. If the local flow does have the required dimensionality, then the eigenvectors spanning the flow are given suitably reduced eigenvalues. The matrix $M_f$ will usually be a continuous function of $\Delta_f$, although the precise definition will depend on the particular matching problem.

In a particular application, the definition of $M_f$ may be physically motivated. For example, in the matching of two colour images, Shafer's dichromatic model (S. A. Shafer, "Using Color to Separate Reflection Components", Color Research and Application 10(4), 210-218, 1985) can be used. The model represents the appearance of a surface as a mixture of two components; a 'body' contribution, which is characteristic of the material, and a 'surface' contribution, which is characteristic of the illuminant. The relative proportions of the components depend on the surface orientation, and on the viewing direction. It follows that two views of the same surface should produce RGB values in the same 2-D subspace. This constraint can easily be imposed within the scheme outlined above.

For example, consider a function pr($f_k$|{$f_n$,n≠k}), which can be used to express the probability of match k given the other existing matches, and the dichromatic model. The probability should be low if the first and third eigenvalues of $\Delta_k^*$ are approximately equal, as this would indicate a lack of local structure (including the special case of perfect matching, |$d_k$|=0). The probability should be high if there is a significant difference between the first and third eigenvalues, as this would indicate a locally one- or two-dimensional structure, either of which would be consistent with the dichromatic model.

Given a definition of the probability, the matrix M is made to have the same eigenvectors as $\Delta_k^*$, but with the first two eigenvalues made inversely proportional to pr $(f_k | \{f_n, n \neq k\})$. The photometric parameters are not actually estimated; the example is based simply on the dimensionality of the dichromatic model.

An embodiment of the flow-representation in a matching scheme will now be described. It is assumed that an existing signal-matching algorithm is provided. The flow field is initialized by the residuals $d_k$ of the first attempt at matching, which uses the ordinary metric, $|d_k|$. The complete tensor field $\Delta_f^*$ is then estimated, as described above. On the second iteration, the new metric $|d_k|_M$ can be used to improve the matching. The improved match residuals contribute back to the flow field, and the tensors $\Delta_f^*$ are re-estimated. This process continues until a given criterion is met. For example, if the eigenvalues of M are suitably defined, then the iterations can continue until the average error $$\frac{1}{K}\sum_K^K |d_k|_M$$

is reduced to a given level. Alternatively, the total number of iterations can be limited.

FIG. 5 illustrates schematically the first two passes of an iterative stereo matching algorithm constituting a further embodiment of the present invention. Signals f' and f" are the left and right hand images from a stereo pair. For clarity, matches between different image points are shown on different rows of the diagram, indicated at 20 and 21, respectively. Image point 31 forms a closed loop with f' and f", indicating a consistent match. This value is therefore used to contribute to the initial estimate of $\mathcal{F}$. Image point 30 does not have a closed loop and therefore is not used in providing the initial estimate.

The flow representation is used in the second iteration (k=2), after which the number of consistently matched points has increased: image point 31 is unchanged as image point 31' whereas image point 30 now forms image point 30', a closed loop indicating a match. The flow field is then recomputed from these new matches in further iterations. Arrows leading into $\mathcal{F}$ indicate residual colour-vectors being passed from a matching stage. Arrows leading out of $\mathcal{F}$ indicate matrices $M_f$ being used to compare pixels in a new matching problem.

The binocular disparity of an image-point between two images in a stereo pair can be estimated by defining a region of pixels containing the point in the first image and locating the most similar region in the other image. There are two problems with this approach. Firstly it is confused by image ambiguities (e.g. featureless regions). Secondly, it is asymmetric with respect to the two input images, as a given scene point may appear in one view only. These problems can be addressed by computing both of the possible disparity maps (i.e. left-to-right and right-to-left), and deleting any inconsistent entries. The result of this procedure is a sparse but relatively accurate disparity map.

The matches retained by the above cross-checking procedure can be used to estimate the RGB flow in $\mathcal{F}$. This is attractive because the consistent matches are likely to be correct and because the cross-checking procedure is effectively parameter-free. Once the colour flow has been estimated, the disparity maps can be re-computed using the metric $|d|_M$ as described above. This process may continue for a fixed number of iterations, or until a convergence condition is met.

Figure 6:
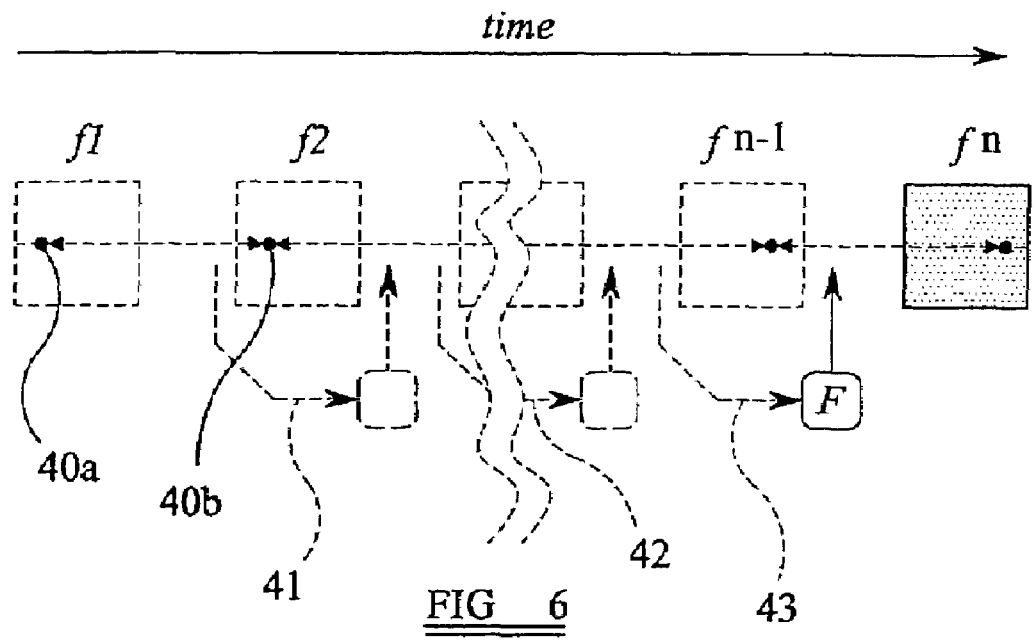
FIG. 6 illustrates a motion estimation algorithm in accordance with an embodiment of the present invention.
Figure 7:
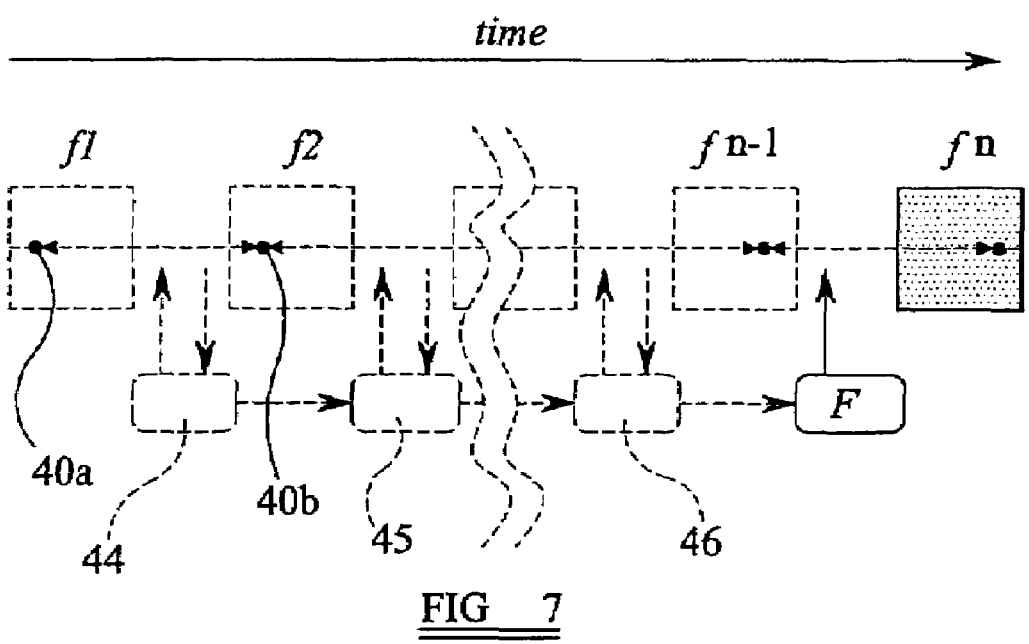
FIG. 7 illustrates a recursive motion estimation algorithm in accordance with an embodiment of the present invention.

In accordance with a further embodiment, the binocular procedure described above can be adapted for motion-estimation, using a video stream as input. This is illustrated in FIGS. 6 and 7. The video can be treated as a series of frames, $f^1 \ldots f^n$. Each adjacent pair of frames can be treated by analogy with the left and right images of a stereo pair. However, the colour flow field need not be independently estimated for each pair of frames. It is expected that each colour flow tensor, $\Delta_f^*$, will show a strong temporal correlation over the course of the video stream. There are two ways to make use of these correlations.

In one embodiment, the process of matching frames $f^n$ and $f^{n-1}$ can make use of the flow-field $\mathcal{F}$ computed from the $f^{n-1} \leftrightarrow f^{n-2}$ correspondences. This is illustrated in FIG. 6 where a flow field 41 is computed between frames $f^1$ and $f^2$, then used for the matching between frames $f^2$ and $f^3$. Similarly, flow fields 42 and 43 are used for subsequent matches. Alternatively, the flow field can be recursively estimated, as shown in FIG. 7. This means that the tensors computed from the $f^n \leftrightarrow f^{n-1}$ correspondences are merged with the tensors from the $f^{n-1} \leftrightarrow f^{n-2}$, and so on to provide a continuously updated flow field 44-46. The advantage with this approach is that, in principle, it would lead to a more accurate and more complete flow-field. The drawback is that the flow-field may contain a proportion of irrelevant information at any given stage.

Figure 8:
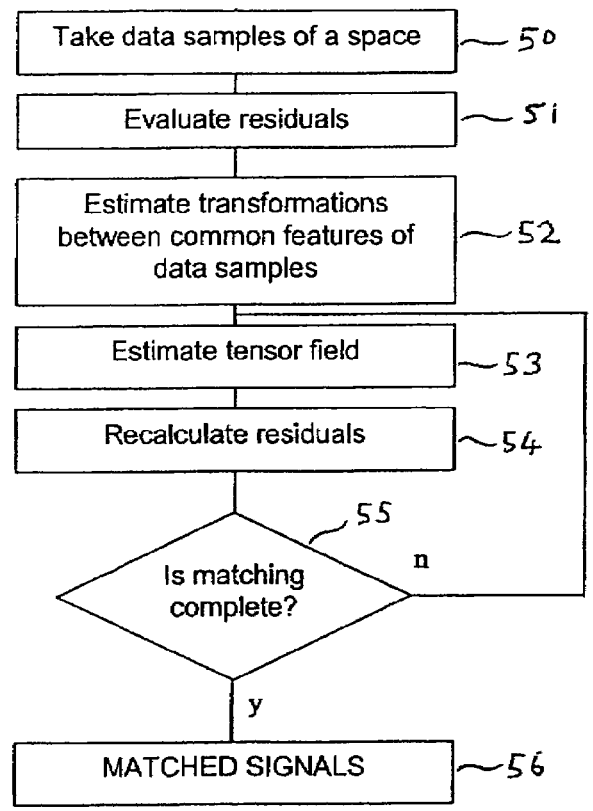
FIG. 8 is a flow chart illustrating a method constituting an embodiment of the present invention.

FIG. 8 is a flow chart illustrating the method of an embodiment of the invention. At step 50, data samples are taken of the space and at step 51 the residuals are evaluated. A first estimate of transformations between the common features of the data samples is obtained at step 52. A tensor field is estimated at step 53 and is used at 54 to recalculate the residuals to provide an improved estimate of the matching between the two signals. At step 55, a decision is made whether the matching is complete. This may be based upon whether a sufficient level of matching has been achieved, or whether a certain number of iterations have been performed. The output of the method is a set of matched signals 56.

The methods described above may be embodied in a program for controlling a computer to perform the method. The program may be stored on a storage medium, for example hard or floppy disks, CD or DVD-recordable media or flash memory storage products. The program may also be transmitted across a communication network, for example the Internet or a group of computers connected together in a LAN.

Figure 9:
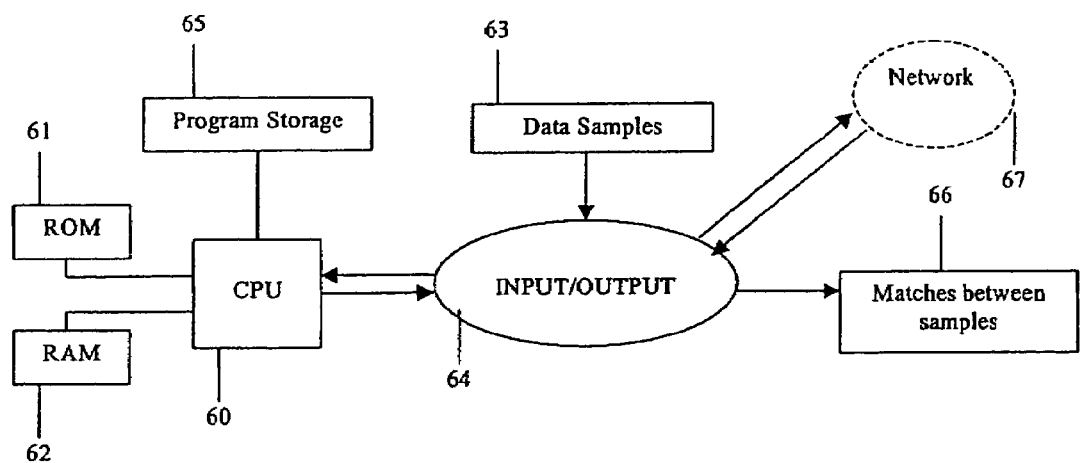
FIG. 9 is a block schematic diagram of an apparatus for performing the method of FIG. 8.

The schematic diagram of FIG. 9 illustrates a central processing unit (CPU) 60 connected to a read-only memory (ROM) 61 and a random access memory (RAM) 62. The CPU is provided with data samples 63 via an input/output mechanism 64. The CPU then performs the matching procedure on the provided data in accordance with the instructions provided by the program storage 65 (which may be a part of the ROM 61) and provides the output, i.e. the matched data samples 66 via the input/output mechanism 64. The program itself, or any of the inputs and/or outputs to the system may be provided or transmitted to/from a communications network 67, which may be, for example the Internet.

What is claimed is:

1. A method of processing data, comprising the steps of:
    (a) comparing first and second samples of a space, said first and second samples being related by a set of transformations, to provide a set of pairs of signals, each of said pairs of signals corresponding to substantially a same feature in said space in said first and second samples;

(b) for each of said pairs of the signals, evaluating residuals corresponding to differences between values of said space at the location of said feature in each said sample;

(c) evaluating a first estimate of said set of transformations from said residuals;

(d) estimating a tensor field representing orientation of flow in said space, said tensor field covering at least one point in said space; and (e) recalculating, from said first estimate and said tensor field, said residuals for each of said pairs of signals to improve said estimate of said set of transformations.

2. A method as claimed in claim 1, comprising the further steps of repeating said steps (d) and (e) at least once.

3. A method as claimed in claim 1 wherein said step (a) comprises using a signal-matching algorithm.

4. A method as claimed in claim 1, wherein said residuals $d_k$ are equal to $f'(p_k)-f''(p_k+t_k)$, where $f'(p_k)$ and $f''(p_k+t_k)$ are a pair of signals corresponding to substantially said same feature in said space, measured at points $p_k$ and $p_k+t_k$, respectively, $t_k$ represents said set of transformations and k is an index of each said pair of signals.

5. A method as claimed in claim 4, wherein said step (c) comprises defining a symmetric and positive-definite matrix M, such that $|d_k|_M=(d_k^T M d_k)^{1/2}$, and minimising $|d_k|_M$ with respect to $t_k$.

6. A method as claimed in claim 1, wherein said step (d) comprises estimating a tensor field for each point in said space.

7. A method as claimed in claim 1, wherein said step (d) comprises determining tensors for regions in which no tensor has yet been determined by interpolating between existing tensors obtained from prior estimates of said set of transformations.

8. A method as claimed in claim 7, wherein said interpolation is based upon a neighbourhood weighting function whose value decreases monotonically away from a location of said pair of signals.

9. A method as claimed in claim 8, wherein said neighbourhood weighting function is a Gaussian function.

10. A method as claimed in claim 1, wherein said tensor field is used to calculate a matrix $M_f$ at each point in said space, representing said set of tranformations.

11. A method as claimed in claim 10, wherein eigenvalues of said matrix $M_f$ are chosen to fit a dimensionality of said set of transformations.

12. A method as claimed in claim 2, wherein said method is iterated until a convergence condition is met.

13. A method as claimed in claim 1, wherein a dimensionality of said estimate of said set of transformations is subject to at least one constraint.

14. A method as claimed in claim 13, wherein said constraint is a spatial smoothness constraint.

15. A method as claimed in claim 13, wherein said constraint is a dichromatic model constraint.

16. A method as claimed in claim 1, wherein said space is a red-green-blue colour space, said first and second samples of said space are first and second images, and said set of transformations represent a spatial disparity at each point in said images.

17. A method as claimed in claim 16, wherein said first and second images are stereoscopic images and said disparity is a parallax disparity.

18. A method of recognising an image including a method as claimed in claim 1, comprising the further step of recognising an image.

19. A method as claimed in claim 1, comprising the further step of predicting an image.

20. A method as claimed in claim 1, comprising the further step of creating a model of a transformation between first and second images, said model comprising said estimated tensor field.

21. A method as claimed in claim 1, comprising the further step of estimating disparity between first and second images, by:

computing first and second disparity maps for corresponding features in said first and second images, representing first image to second image disparity and second image to first image disparity, respectively;

deleting inconsistent entries from said first and second disparity maps to obtain a cross-checked third disparity map; and improving the third disparity map by performing said steps (a) to (e), using said third disparity map as said first estimate of said set of transformations.

22. A method as claimed in claim 1, comprising the furthest step of estimating motion in a video stream, wherein said first and second samples are pairs of images from said video stream in a red-green-blue colour space.

23. A method as claimed in claim 22, wherein step (d) comprises estimating a current tensor field using a prior tensor field evaluated when matching a prior pair of said images from said video stream.

24. A method as claimed in claim 23, wherein said current tensor field is recursively estimated from said prior tensor field.

25. A method as claimed in claim 1, comprising the further step of performing a speech recognition algorithm, wherein said data is audio data.

26. A program stored on a computer readable storage medium for controlling a computer to perform the steps of:

(a) comparing first and second samples of a space, said first and second samples being related by a set of transformations, to provide a set of pairs of signals, each of said pairs of signals corresponding to substantially a same feature in said space in said first and second samples;

(b) for each of said pairs of the signals, evaluating residuals corresponding to differences between values of said space at the location of said feature in each said sample;

(c) evaluating a first estimate of said set of transformations from said residuals;

(d) estimating a tensor field representing orientation of flow in said space, said tensor field covering at least one point in said space; and (e) recalculating, from said first estimate and said tensor field, said residuals for each of said pairs of signals to improve said estimate of said set of transformations.

27. A computer programmed by a program as claimed in claim 26.

28. An apparatus for matching signals, comprising:

(a) means for comparing first and second samples of a space, said first and second samples being related by a set of transformations, to provide a set of pairs of signals, each of said pairs of signals corresponding to substantially a same feature in said space in said first and second samples;

(b) means for evaluating residuals for each of said pairs of signals, said residuals corresponding to said differences between said characteristics of said space at a location of said feature in each said sample;

(c) means for evaluating a first estimate of said set of transformations using said residuals;

(d) means for estimating a tensor field representing orientation of flow in said space, said tensor field covering each point in said space; and (e) means for recalculating, from said first estimate and said tensor field, said residuals for each of said pairs of signals to improve said estimate of said set of transformations.

* * * * *